United States Patent
Lee et al.

(10) Patent No.: US 11,055,889 B2
(45) Date of Patent: Jul. 6, 2021

(54) ELECTRONIC DEVICE DISPLAYING AVATAR MOTION-PERFORMED AS PER MOVEMENT OF FACIAL FEATURE POINT AND METHOD FOR OPERATING SAME

(71) Applicant: SAMSUNG ELECTRONICS CO., LTD., Suwon-si (KR)

(72) Inventors: Wooyong Lee, Suwon-si (KR); Hyejin Kang, Suwon-si (KR); Jiyoon Park, Suwon-si (KR); Jaeyun Song, Suwon-si (KR); Junho An, Suwon-si (KR); Jonghoon Won, Suwon-si (KR); Hyoungjin Yoo, Suwon-si (KR); Minsheok Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/282,798

(22) Filed: Feb. 22, 2019

(65) Prior Publication Data
US 2019/0266775 A1    Aug. 29, 2019

(30) Foreign Application Priority Data

Feb. 23, 2018    (KR) .......................... 10-2018-0022259

(51) Int. Cl.
*G06T 13/40*    (2011.01)
*G06K 9/00*    (2006.01)
(Continued)

(52) U.S. Cl.
CPC .......... *G06T 13/40* (2013.01); *G06K 9/00255* (2013.01); *G06K 9/00261* (2013.01); *G06K 9/00281* (2013.01); *G06K 9/00315* (2013.01)

(58) Field of Classification Search
None
See application file for complete search history.

(56) References Cited

U.S. PATENT DOCUMENTS

| | | |
|---|---|---|
| 5,802,220 A | 9/1998 | Black et al. |
| 6,272,231 B1 | 8/2001 | Maurer et al. |
| (Continued) | | |

FOREIGN PATENT DOCUMENTS

| | | |
|---|---|---|
| KR | 10-2003-0029638 | 4/2003 |
| KR | 10-2006-0064553 | 6/2006 |
| KR | 10-2008-0063308 | 7/2008 |

OTHER PUBLICATIONS

Search Report dated Jun. 3, 2019 in counterpart International Patent Application No. PCT/KR2019/002289.
(Continued)

*Primary Examiner* — Yingchun He
(74) *Attorney, Agent, or Firm* — Nixon & Vanderhye P.C.

(57) ABSTRACT

According to an embodiment, an electronic device comprises a camera, a display, and a processor configured to control the electronic device to: obtain a plurality of images including a first image and a second image corresponding to a user's face using the camera, display, on the display, a first avatar selected from among at least one 3D avatar including model information related to a motion and created based on 3D modeling, determine a degree of variation in at least some feature points among the plurality of feature points of the face based on a comparison between the plurality of feature points of the face included in each of the first image and the second image, determine a weight for at least some of a plurality of reference models related to a motion of the first avatar based at least on the degree of variation determined, and display, on the display, the first avatar on which the motion is performed based on the plurality of reference models and the weight.

20 Claims, 20 Drawing Sheets

(51) Int. Cl.
G06F 3/0346 (2013.01)
G06F 3/01 (2006.01)

(56) References Cited

U.S. PATENT DOCUMENTS

| | | |
|---|---|---|
| 6,307,576 B1 | 10/2001 | Rosenfeld |
| 2006/0188144 A1 | 8/2006 | Sasaki et al. |
| 2008/0019576 A1 | 1/2008 | Senftner et al. |
| 2009/0262989 A1* | 10/2009 | Kozakaya .......... G06K 9/00208 382/118 |
| 2012/0223952 A1* | 9/2012 | Kanemaru ......... G06K 9/00335 345/473 |
| 2012/0309520 A1 | 12/2012 | Evertt et al. |
| 2014/0022249 A1 | 1/2014 | Ye et al. |
| 2015/0213604 A1 | 7/2015 | Li et al. |
| 2016/0042548 A1 | 2/2016 | Du et al. |
| 2016/0140332 A1* | 5/2016 | Pfursich ............. G06K 9/00899 726/19 |

OTHER PUBLICATIONS

Written Opinion dated Jun. 3, 2019 in counterpart International Patent Application No. PCT/KR2019/002289.
Extended European Search Report dated Oct. 15, 2020 for EP Application No. 19757176.3.

* cited by examiner

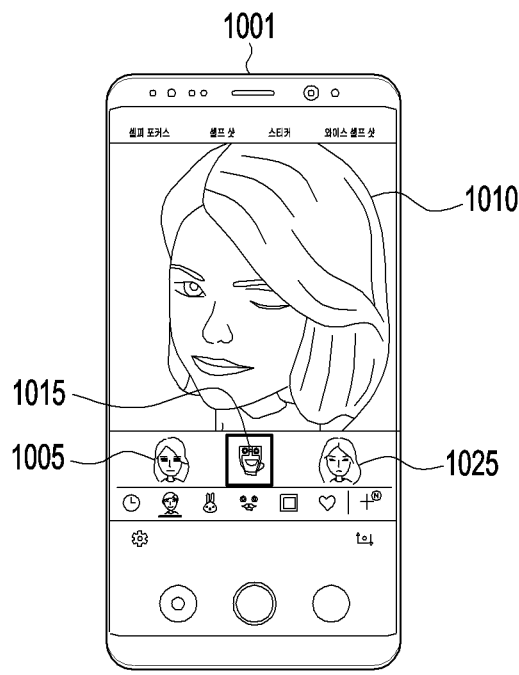
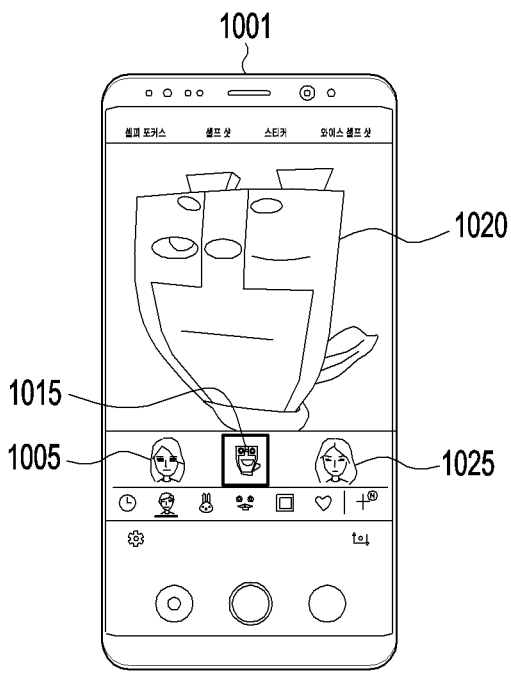
FIG.10A  FIG.10B
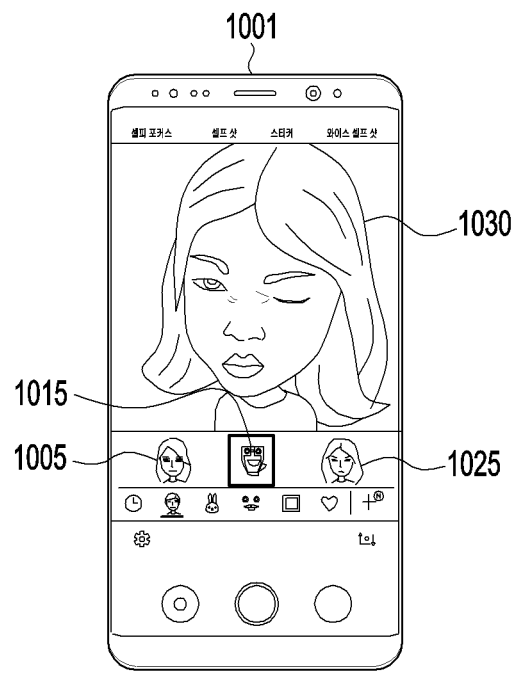
FIG.10C

ELECTRONIC DEVICE DISPLAYING AVATAR MOTION-PERFORMED AS PER MOVEMENT OF FACIAL FEATURE POINT AND METHOD FOR OPERATING SAME

CROSS-REFERENCE TO RELATED APPLICATION

This application is based on and claims priority under 35 U.S.C. § 119 to Korean Patent Application No. 10-2018-0022259, filed on Feb. 23, 2018, in the Korean Intellectual Property Office, the disclosure of which is incorporated by reference herein in its entirety.

BACKGROUND

Field

The disclosure relates to an electronic device for displaying an avatar motion-performed as per the movement of a facial feature point and a method for operating the electronic device.

Description of Related Art

Advancing electronic technology enables various functions to be performed on a single electronic device, e.g., smartphone. Active research efforts have recently been made for avatars which may represent users' body motions or facial expressions, and various applications using them are being developed.

An electronic device may provide a method for controlling avatars through users' interactions. Beyond the mere control of the actions of avatars, an electronic device may control the facial expression of avatars, allowing the avatars to make lifelike expressions. Thus, the electronic device may provide a three-dimensional (3D) avatar that may mimic the user's facial expressions in 3D. Controlling an avatar in a precise and lifelike manner following the user's facial expressions or body motions may deliver more immersive experiences to the user. It may thus be important to make the avatar represent the user's emotions well.

Conventional electronic devices identify the user's face using a camera and create an avatar based on the user's face identified by the camera. The electronic devices change the avatar's expression depending on variation in the avatar's expression. However, conventional electronic devices cannot provide avatars that are able to make natural and delicate facial expressions that follow variations in the user's facial expression. Conventional electronic devices cannot give avatars natural and delicate facial expressions suited for the characteristics of avatars.

The above information is presented as background information only to assist with an understanding of the disclosure. No determination has been made, and no assertion is made, as to whether any of the above might be applicable as prior art with regard to the disclosure.

SUMMARY

According to an embodiment, there may be provided an electronic device capable of creating an avatar able to make natural and delicate facial expressions as per variations in the user's facial expression using a plurality of feature points included in the user's face and a method for operating the electronic device.

According to an embodiment, there may be provided an electronic device to provide an avatar capable of making natural and delicate facial expressions suited for the characteristics of the avatar as per variations in the user's facial expression and a method for operating the electronic device.

According to an embodiment, an electronic device comprises a camera, a display, and a processor configured to control the electronic device to: obtain a plurality of images including a first image and a second image corresponding to a user's face using the camera, display, on the display, a first avatar selected from among at least one three-dimensional (3D) avatar including model information related to a motion, determine a degree of variation between at least some of a plurality of first feature points corresponding to the face included in the first image and at least some of a plurality of second feature points corresponding to the face included in the second image, determine a weight for at least some of a plurality of reference models related to a motion of the first avatar based at least on the degree of variation, and display, on the display, the first avatar on which the motion is performed based on the plurality of reference models and the weight.

According to an embodiment, a method of operating an electronic device, comprises: obtaining a plurality of images including a first image and a second image corresponding to a user's face using a camera of the electronic device; displaying, on a display of the electronic device, a first avatar selected from among at least one 3D avatar including model information related to a motion; determining a degree of variation between at least some of a plurality of first feature points corresponding to the face included in the first image and at least some of a plurality of second feature points corresponding to the face included in the second image; determining a weight for at least some of a plurality of reference models related to a motion of the first avatar based on, at least, the degree of variation; and displaying, on the display, the first avatar on which the motion is performed based on the plurality of reference models and the weight.

According to an embodiment, there is provided a computer readable recording medium storing a program which, when executed by a processor, controls an electronic device to perform operations including: obtaining a plurality of images including a first image and a second image corresponding to a user's face using a camera of an electronic device, displaying, on a display of the electronic device, a first avatar selected from among one or more 3D avatars including model information related to a motion, determining a degree of variation between at least some of a plurality of first feature points corresponding to the face included in the first image and at least some of a plurality of second feature points corresponding to the face included in the second image, determining a weight for at least some of a plurality of reference models related to a motion of the first avatar based at least on the degree of variation, and displaying, on the display, the first avatar on which the motion is performed based on the plurality of reference models and the weight.

Other aspects, advantages, and salient features of the disclosure will become apparent to those skilled in the art from the following detailed description, which, taken in conjunction with the annexed drawings, discloses various example embodiments of the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 10A, 10B, and 10C are diagrams illustrating an example operation in which an electronic device provides an avatar according to an embodiment;

Throughout the drawings, like reference numerals will be understood to refer to like parts, components, and structures.

DETAILED DESCRIPTION

Figure 1:
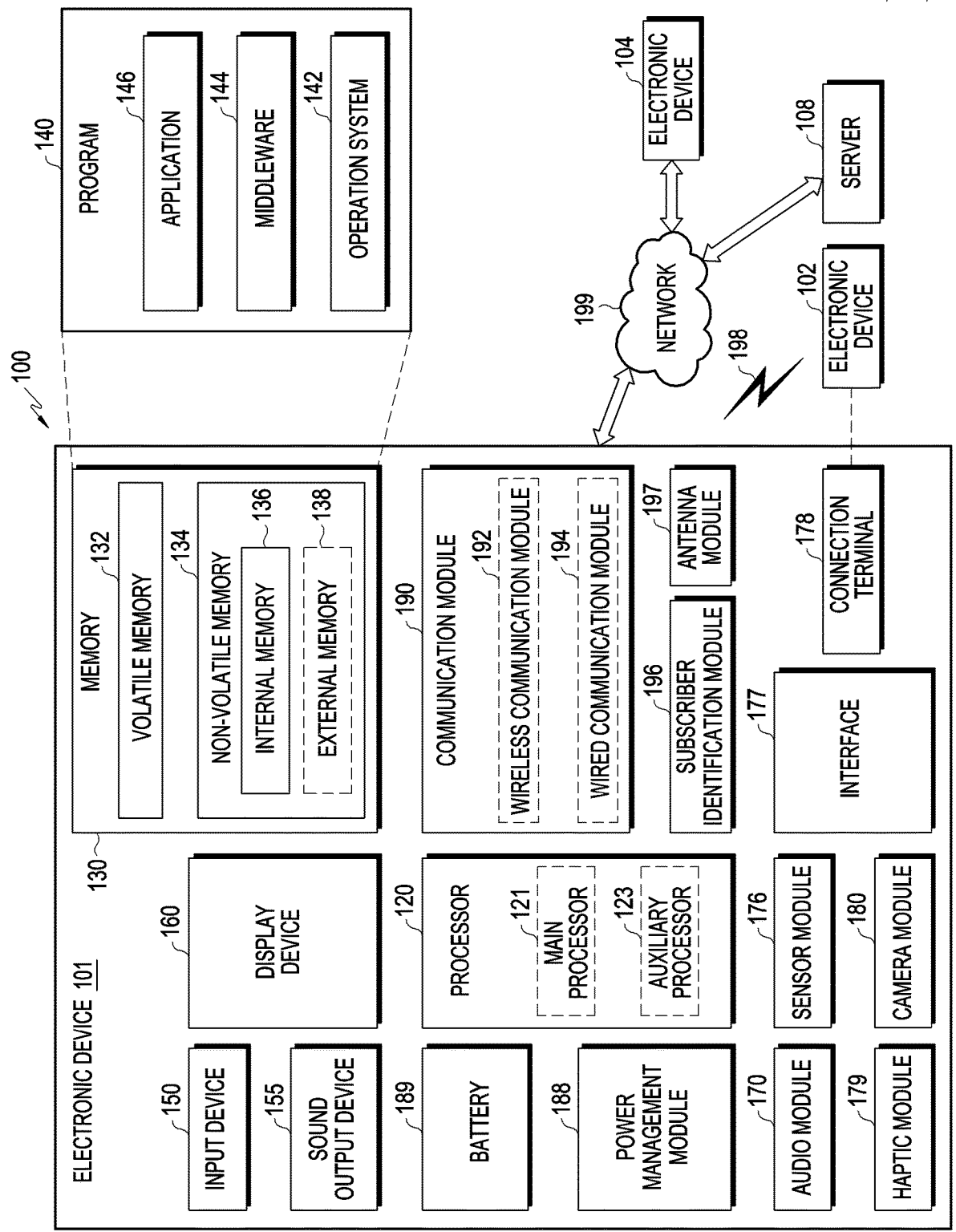
FIG. 1 is a block diagram illustrating an example electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, e.g., software (e.g., a program 140) to control at least one other component (e.g., a hardware or software component) of the electronic device 101 connected with the processor 120 and may process or compute various data. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone) directly or wirelessly connected with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or wireless communication channel between the electronic device 101 and an external electronic device (e.g., the electronic device 102, the electronic device 104, or the server 108) and performing communication through the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The first and second external electronic devices 102 and 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic device is not limited to the above-listed embodiments.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, a module may be implemented in the form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
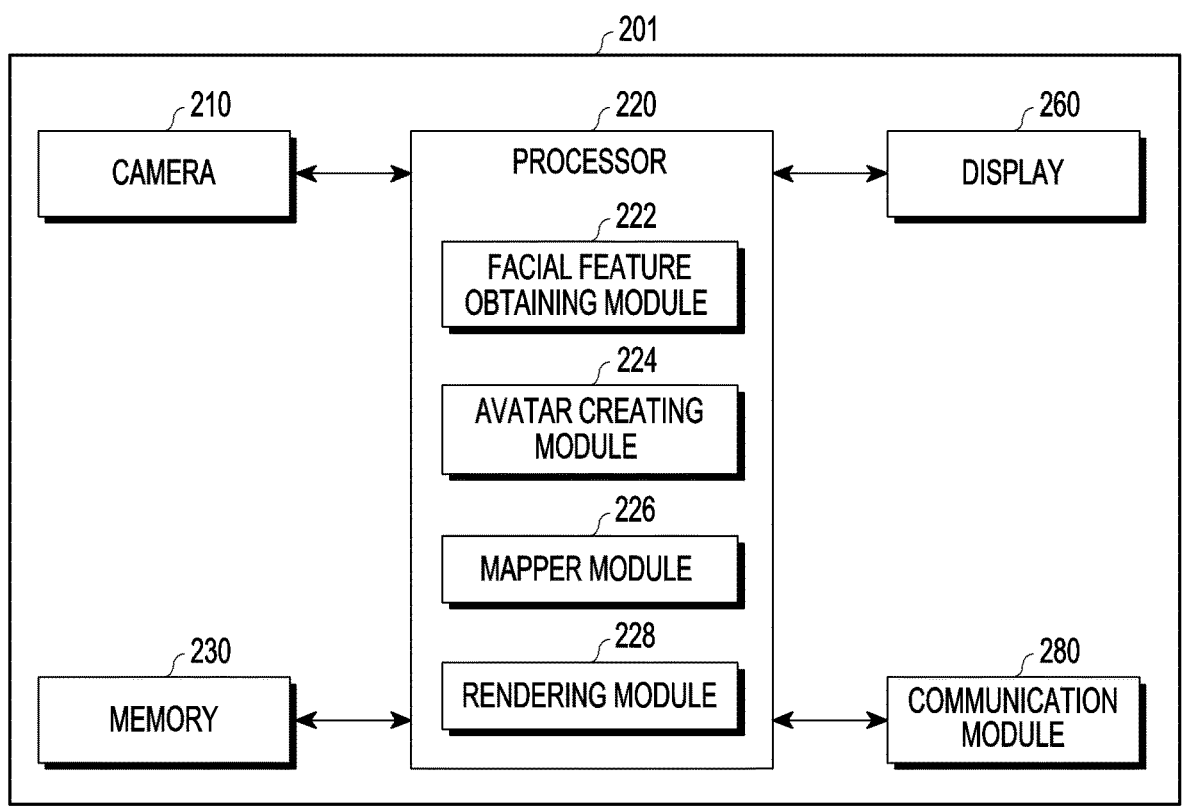
FIG. 2 is a block diagram illustrating an example electronic device according to an embodiment.

FIG. 2 is a block diagram illustrating an example electronic device according to an embodiment.

Referring to FIG. 2, an electronic device 201 may be implemented in substantially the same or a similar manner to the electronic device 101 described above in connection with FIG. 1. For example, the electronic device 201 may be implemented as a smartphone or a tablet PC, but it will be understood that the disclosure is not limited thereto.

The electronic device 201 may include a camera 210, a processor (e.g., including processing circuitry) 220, a memory 230, a display 260, and a communication module (e.g., including communication circuitry) 280.

The camera 210 may capture at least part of the user's body. For example, the camera 210 may be implemented in substantially the same or a similar manner to the camera module 180 described above in connection with FIG. 1.

According to an embodiment, the camera 210 may obtain a plurality of images corresponding to the user's face. For example, the plurality of images may refer, for example, to a plurality of frames obtained by capturing the user's face. The plurality of images may include a first image and a second image. For example, the first image and the second image may include a plurality of feature points included in the user's face.

The plurality of feature points each may be a designated region of the face. For example, each of the plurality of feature points may be a respective one of 101 different regions (or points) on the face.

The processor 220 may include various processing circuitry and/or executable program elements and determine the position and size of the eyes, ears, nose, and mouth, the position and size of the eyebrows, the degree of darkness of the eyebrows, the position of wrinkles, inter-eyebrow distance, the position and size of the chin, the position and size of the upper chins, the position and size of the forehead, the contour and size of the face, skin color and tone, hair color and position, and/or the position and size of scars based on the plurality of feature points.

The processor 220 may include various processing circuitry and control the overall operation of the electronic device. For example, the processor 220 may be implemented in substantially the same or a similar manner to the processor 120 described above in connection with FIG. 1.

According to an embodiment, the processor 220 may provide at least one selected from at least one three-dimensional (3D) avatar created based on 3D modeling. The processor 220 may provide an avatar that has expressions corresponding to the user's facial expressions using the plurality of images received through the camera 210. The processor 220 may track variation in the user's facial expression and alter the avatar's expression according to the tracked variation in the facial expression.

According to an embodiment, the processor 220 may obtain a first image using the camera 210. The processor 220 may create an avatar using a plurality of feature points on the user's face included in the first image. The processor 220 may provide the avatar through the display 260. For example, the first image may be an image including the plurality of feature points, which may serve as a reference, among the plurality of images.

The avatar may be created based on 3D modeling. The avatar may represent a character similar to the user's face. The avatar may represent a designated character (e.g., a comic character). For example, and without limitation, the avatar may be created by the processor 220, be downloaded from an external electronic device (e.g., 102 or 104 of FIG. 1), or the like. The avatar may include, for example, and without limitation, an emoji and/or augmented reality (AR) emoji, or the like.

According to an embodiment, the processor 220 may determine whether a variation is made to the plurality of feature points included in the second image with respect to the first image (or the plurality of feature points included in the first image). For example, the processor 220 may compare at least some of the plurality of feature points in the first image with at least some of the plurality of feature points in the second image and determine whether a variation is made between at least some of the plurality of feature points in the first image and at least some of the plurality of feature points in the second image based on the result of the comparison. The processor 220 may also determine the degree of variation made between at least some of the plurality of feature points in the first image and at least some of the plurality of feature points in the second image. The second image may be an image obtained after the first image is obtained. The second image may be an image representing a variation in the user's facial expression with respect to the first image.

According to an embodiment, the processor 220 may determine a weight for a plurality of reference models to represent a designated motion (e.g., an expression) based on the degree of variation (or the degree of motion) in the plurality of feature points in the second image. For example, the weight for the plurality of reference models may be determined based on the degree of variation in each of the plurality of feature points. For example, the plurality of reference models may include a plurality of morph targets. For example, the plurality of reference models may include morph targets to represent 75 different motions (e.g., expressions).

According to an embodiment, the processor 220 may determine a variation in motion (e.g., a variation in expression) of the avatar corresponding to a variation in the user's motion (e.g., a variation in the facial expression) using the plurality of weight-reflected reference models. For example, the processor 220 may create an avatar in which at least one of the plurality of feature points has been varied (e.g., an avatar that has changed its expression) by combining the plurality of weight-reflected reference models. The processor 220 may provide the motion-varied (e.g., expression-varied) avatar through the display 260.

The processor 220 may include a facial feature obtaining module (e.g., including processing circuitry and/or executable program elements) 222, an avatar creating module (e.g., including processing circuitry and/or executable program elements) 224, a mapper module (e.g., including processing circuitry and/or executable program elements) 226, and a rendering module (e.g., including processing circuitry and/or executable program elements) 228. For example, the processor 220 may execute at least one of the facial feature obtaining module 222, the avatar creating module 224, the mapper module 226, and the rendering module 228.

According to an embodiment, the facial feature obtaining module 222 may include various processing circuitry and/or executable program elements and analyze a plurality of images including the user's face obtained by the camera. The facial feature obtaining module 222 may determine the user's facial features included in the plurality of images. For example, the facial feature obtaining module 222 may determine facial features for a two-dimensional (2D) image using the plurality of images. The facial feature obtaining module 222 may determine a plurality of feature points corresponding to designated regions of the face and determine the user's facial features through the plurality of feature points.

According to an embodiment, the facial feature obtaining module 222 may steadily track the plurality of feature points included in the plurality of images and obtain position information of each feature point to represent the facial features in 3D based on the tracked feature points. The facial feature obtaining module 222 may transmit the obtained information about each feature point to the avatar creating module 224.

The avatar creating module 224 may include various processing circuitry and/or executable program elements and create an avatar using the plurality of feature points included in the first image. The avatar creating module 224 may create an avatar similar to the user's facial features using the position information of the plurality of feature points obtained by the facial feature obtaining module 222. For example, the avatar creating module 224 may create a 3D avatar based on 3D modeling. The avatar creating module 224 may store the created avatar in the memory 230.

The mapper module 226 may include various processing circuitry and/or executable program elements and determine the weight for a plurality of reference models based on the obtained information about the plurality of feature points. The mapper module 226 may determine a variation in the user's facial expression by combining the plurality of weight-reflected reference models. For example, the mapper module 226 may determine the degree of variation in facial expression by combining the expressions represented by the plurality of weight-reflected reference models.

The rendering module 228 may include various processing circuitry and/or executable program elements and create an expression-varied avatar based on the degree of variation in the user's facial expression. The rendering module 228 may provide the expression-varied avatar through the display 260.

According to an embodiment, the processor 220 may provide an avatar selected from among at least one avatar stored in the memory 230 through the display. For example, at least one avatar may include an avatar previously created and/or an avatar downloaded from the external electronic device (e.g., 102 or 104 of FIG. 1).

According to an embodiment, the processor 220 may reflect different features to the avatars even though the avatars make the same expression. For example, the processor 220 may emphasize the respective features of the avatars for the same expression and display the avatars.

The memory 230 may store data of the electronic device 201. For example, the memory 230 may be implemented in substantially the same or a similar manner to the memory 130 described above in connection with FIG. 1. For example, the memory 230 may be implemented as a non-volatile memory, but it will be understood that the disclosure is not limited thereto.

According to an embodiment, the memory 230 may store data about the avatars. For example, the memory 230 may store data about the plurality of feature points included in the first image. The memory 230 may store at least one avatar created by the processor 220 and/or an avatar downloaded from the external electronic device (e.g., 102 or 104 of FIG. 1). The memory 230 may store the plurality of reference models (e.g., morph targets).

The display 260 may display avatars under the control of the processor 220. The display 260 may be implemented in substantially the same or a similar manner to the display device 160 described above in connection with FIG. 1.

The communication module 280 may include various communication circuitry and receive data about an avatar from the external electronic device (e.g., 102 or 104 of FIG. 1). The communication module 280 may transmit data about the avatar stored in the memory 230 to the external electronic device (e.g., 102 or 104 of FIG. 1).

Figure 3:
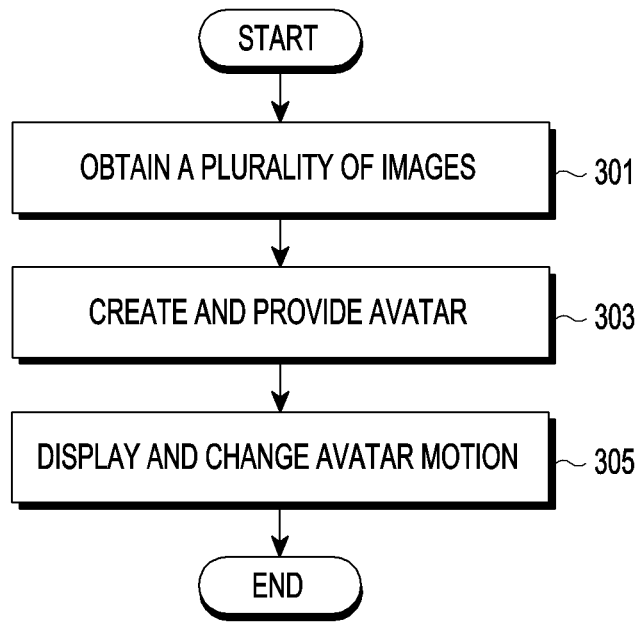
FIG. 3 is a flowchart illustrating an example method of operating an electronic device to provide an avatar according to an embodiment.

FIG. 3 is a flowchart illustrating an example method of operating an electronic device in order to provide an avatar according to an embodiment.

Referring to FIG. 3, in operation 301, an electronic device (e.g., the electronic device 201 of FIG. 2) may obtain a plurality of images including the user's face through a camera (e.g., the camera 210 of FIG. 2).

In operation 303, the electronic device 201 may create and provide avatars. For example, the electronic device 201 may extract feature points of the user's face included in each of the plurality of images and create an avatar based on the extracted feature points. The electronic device 201 may display the created avatar on a display (e.g., the display 260 of FIG. 2).

In operation 305, the electronic device 201 may display the avatar on the display 260 while altering the avatar's motion (e.g., expression) depending on a variation in the user's facial motion (e.g., a variation in the facial expression) obtained through the camera 210. The electronic device 201 may alter, in real-time, the avatar's motion (e.g., expression) depending on the varying motion of the user (e.g., facial expression) and display the avatar which reflects the varied motion on the display 260.

Each of the above-described operations may be performed by a processor (e.g., the processor 120 of FIG. 1, the processor 220 of FIG. 2, or an image signal processor (ISP)).

Figure 4:
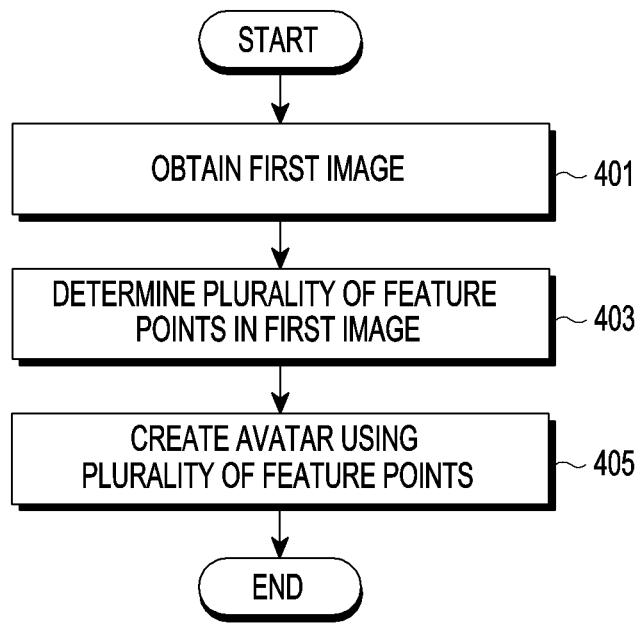
FIG. 4 is a flowchart illustrating an example method of operating an electronic device to provide an avatar according to an embodiment.

FIG. 4 is a flowchart illustrating an example method of operating an electronic device to provide an avatar according to an embodiment.

Referring to FIG. 4, an electronic device (e.g., the electronic device 201 of FIG. 2) may obtain a plurality of images including the user's face through a camera (e.g., the camera 210 of FIG. 2).

In operation 401, the electronic device 201 may obtain a first image including a plurality of feature points, which serve as a reference, among the plurality of images. In operation 403, the electronic device 201 may determine the plurality of feature points included in the first image. For example, the electronic device 201 may determine the position of the plurality of feature points.

In operation 405, the electronic device 201 may create an avatar using the plurality of feature points. For example, the electronic device 201 may create an avatar reflecting the plurality of feature points based on the position of the plurality of feature points.

The electronic device 201 may determine that a plurality of feature points (e.g., a plurality of feature points serving as a reference) representing the user's neutral expression (or blank expression) are reference feature points. For example, the reference feature points may be feature points that serve as a reference to determine a variation in the avatar's expression (e.g., facial feature points in the blank expression or neutral expression).

Each of the above-described operations may be performed by a processor (e.g., the processor 120 of FIG. 1, the processor 220 of FIG. 2, or an image signal processor (ISP)).

Figure 5:
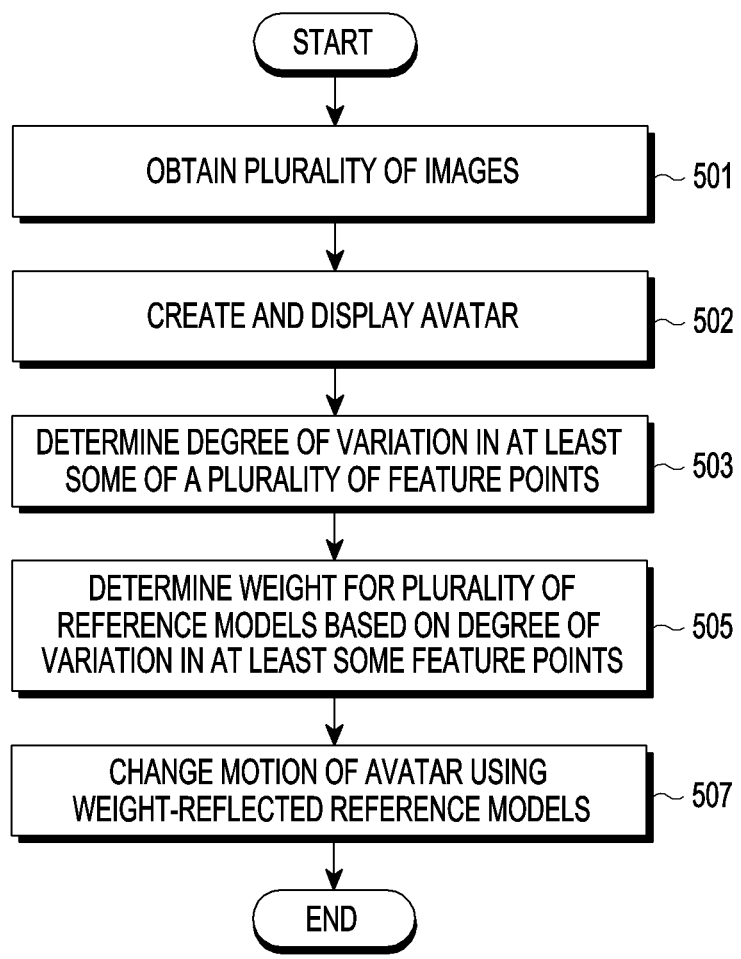
FIG. 5 is a flowchart illustrating an example method of operating an electronic device to vary an expression of an avatar according to an embodiment.

FIG. 5 is a flowchart illustrating an example method of operating an electronic device to vary the expression of an avatar according to an embodiment.

Referring to FIG. 5, in operation 501, an electronic device (e.g., the electronic device 201 of FIG. 2) may obtain a plurality of images including the user's face through a camera (e.g., the camera 210 of FIG. 2).

In operation 502, the electronic device 201 may create an avatar using a plurality of feature points on the user's face included in a first image among the plurality of images. The electronic device 201 may display the created avatar on a display (e.g., the display 260 of FIG. 2). The electronic device 201 may select any one from among at least one avatar stored in a memory (e.g., the memory 230 of FIG. 2) and display the selected avatar on the display 260.

While displaying the avatar, the electronic device 201 may obtain a second image including the user's face through the camera 210 and determine a plurality of feature points on the user's face included in the second image.

In operation 503, the electronic device 201 may determine whether a variation is made to at least some of the plurality of feature points included in the second image and/or the degree of variation with respect to the first image (or the plurality of feature points included in the first image).

In operation 505, the electronic device 201 may determine the weight for each (or at least some) of a plurality of reference models each of which corresponds to a respective one of a plurality of motions (e.g., expressions) based on the degree of variation in at least some feature points. For example, the electronic device 201 may determine the weight according to the degree of variation in at least some feature points for the expressions represented by the plurality of reference models.

In operation 507, the electronic device 201 may alter the avatar's motion (e.g., expression) using the plurality of weight-reflected reference models. For example, the electronic device 201 may create an avatar having a motion (e.g., expression) that results from combining the plurality of weight-reflected reference models and display the avatar having a varied motion (e.g., expression) on the display 260.

According to an embodiment, the electronic device 201 may resize the avatar based on the distance (or the angle of view of the camera 210) between the user's face and the electronic device 201 (e.g., the camera 210 of FIG. 2) For example, when the interval between the plurality of feature points included in the second image narrows at a predetermined rate with respect to the first image (or the plurality of feature points included in the first image), the electronic device 201 may determine that the distance between the user's face and the electronic device 201 (e.g., the camera 210) increases. When the interval between the plurality of feature points included in the second image widens at a predetermined rate with respect to the first image (or the plurality of feature points included in the first image), the electronic device 201 may determine that the distance between the user's face and the electronic device 201 (e.g., the camera 210) decreases. For example, as the user's face comes closer to the electronic device 201, the electronic device 201 may enlarge the avatar, and as the user's face is farther away from the electronic device 201, the electronic device 201 may shrink the avatar. The electronic device 201 may display the resized avatar on the display 260.

Each of the above-described operations may be performed by a processor (e.g., the processor 120 of FIG. 1, the processor 220 of FIG. 2, or an image signal processor (ISP)).

Figure 6A:
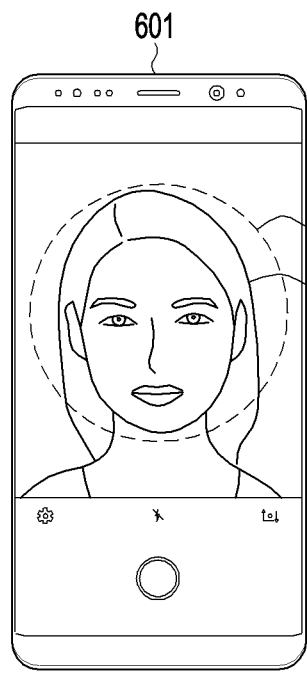
FIGS. 6A, 6B, and 6C are diagrams illustrating an example operation in which an electronic device creates an avatar according to an embodiment.
Figure 6B:
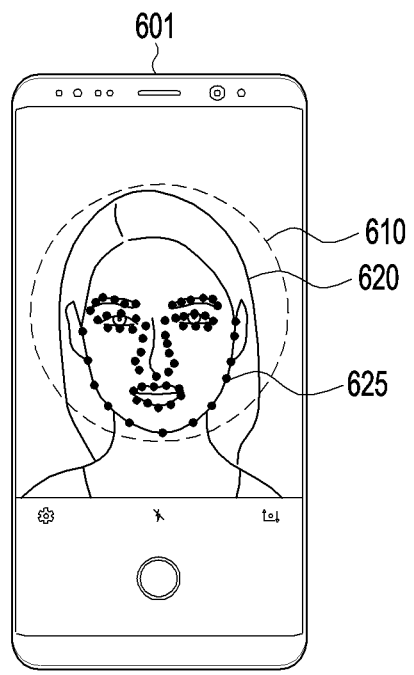
Figure 6C:
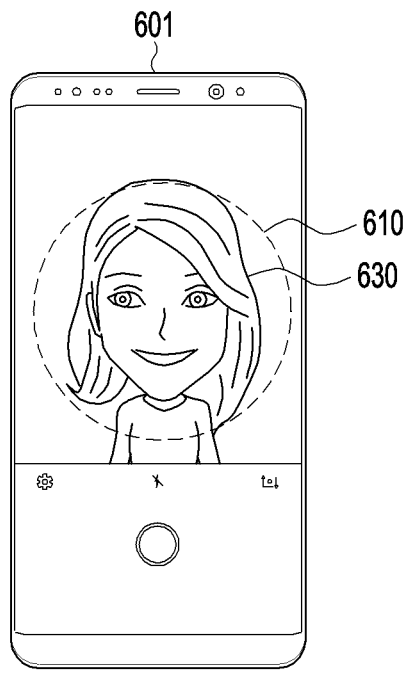

FIGS. 6A, 6B, and 6C are diagrams illustrating an example operation in which an electronic device creates an avatar according to an embodiment.

Referring to FIGS. 6A, 6B and 6C, an electronic device 601 (e.g., the electronic device 201 of FIG. 2) may obtain a plurality of images including the user's face 620 through a camera (e.g., the camera 210 of FIG. 2).

According to an embodiment, with reference to, for example, FIG. 6A, the electronic device 601 may display a facial recognition region 610 for recognizing the user's face 620 on a display (e.g., the display 260 of FIG. 2). When the user's face 620 is positioned within the facial recognition region 610, the electronic device 601 may obtain a first image including a plurality of feature points that serve as a reference.

Referring to FIG. 6B, when the user's face 620 is positioned inside the facial recognition region 610, the electronic device 601 may determine the plurality of feature points 625 included in the user's face 620. For example, the electronic device 601 may determine the plurality of feature points 625 positioned in a designated region of the face. The number of the plurality of feature points 625 may be set automatically or by the user.

Referring to FIG. 6C, the electronic device 601 may create an avatar 630 similar to the user's face using the plurality of feature points 625. The electronic device 601 may display the created avatar 630 in the facial recognition region 610.

The size and/or shape of the facial recognition region 610 illustrated in FIGS. 6A, 6B and 6C are provided for ease of description, and the technical spirit of the disclosure is not limited thereto.

Figure 7:
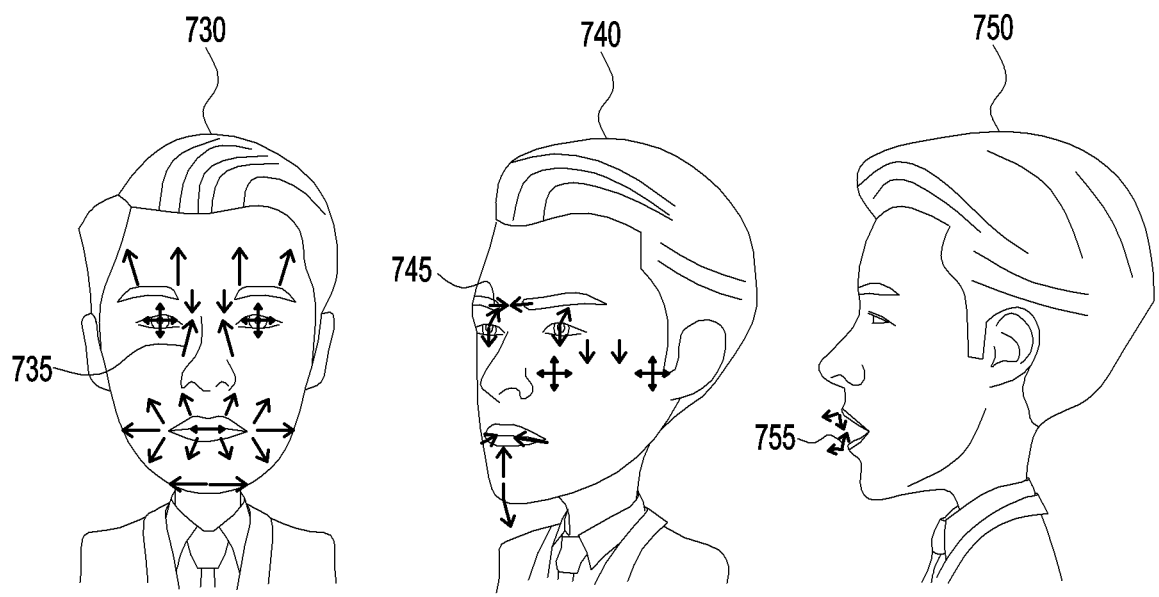
FIG. 7 is a diagram illustrating an example operation in which an electronic device determines variations in a plurality of feature points according to an embodiment.

FIG. 7 is a diagram illustrating an example operation in which an electronic device determines variations in a plurality of feature points according to an embodiment.

Referring to FIG. 7, an electronic device (e.g., the electronic device 201 of FIG. 2) may compare a first image and a second image, obtained later than the first image, among a plurality of images, determining a variation in the user's facial expression.

According to an embodiment, the electronic device 201 may determine whether a variation is made to a plurality of feature points included in the second image with respect to a plurality of feature points included in the first image and the degree of variation.

The electronic device 201 may create a first model 730 in a first direction (e.g., in a front view) based on the plurality of feature points included in the first image and 3D modeling. The electronic device 201 may determine the degree 735 of variation in the plurality of feature points included in the second image with respect to the plurality of feature points included in the first model 730 corresponding to the first image.

The electronic device 201 may create a second model 740 in a second direction (e.g., in a half side view) based on the plurality of feature points included in the first image and 3D modeling. The electronic device 201 may determine the degree 745 of variation in the plurality of feature points included in the second image with respect to the plurality of feature points included in the second model 740 corresponding to the first image.

The electronic device 201 may create a third model 750 in a third direction (e.g., in a side view) based on the plurality of feature points included in the first image and 3D modeling. The electronic device 201 may determine the degree 755 of variation in the plurality of feature points included in the second image with respect to the plurality of feature points included in the third model 750 corresponding to the first image.

The electronic device 201 may determine the degrees 735, 745, and 755 of variations in at least some among the plurality of feature points for the first model 730, the second model 740, and the third model 750. The electronic device 201 may determine the weight for each of the plurality of reference models based on the determined degrees 735, 745, and 755.

Figure 8A:
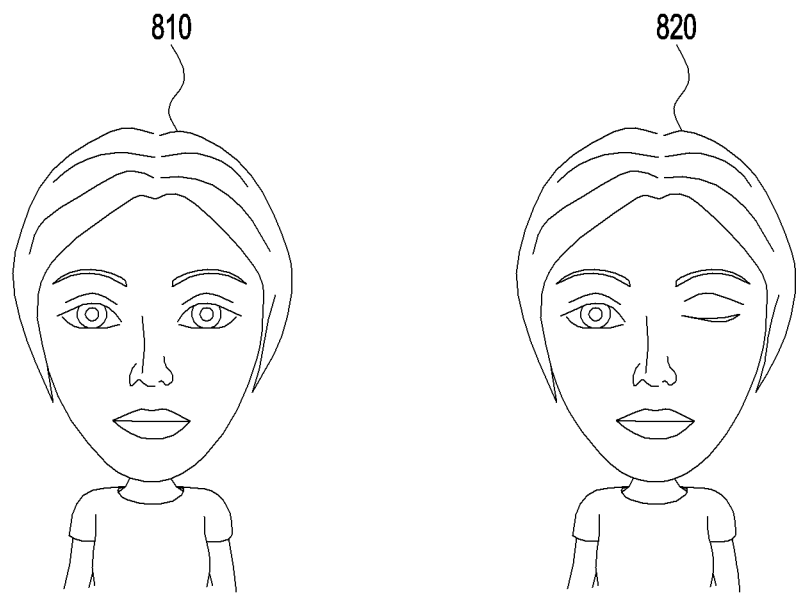
FIGS. 8A and 8B are diagrams illustrating example reference models an electronic device may use according to an embodiment.
Figure 8B:
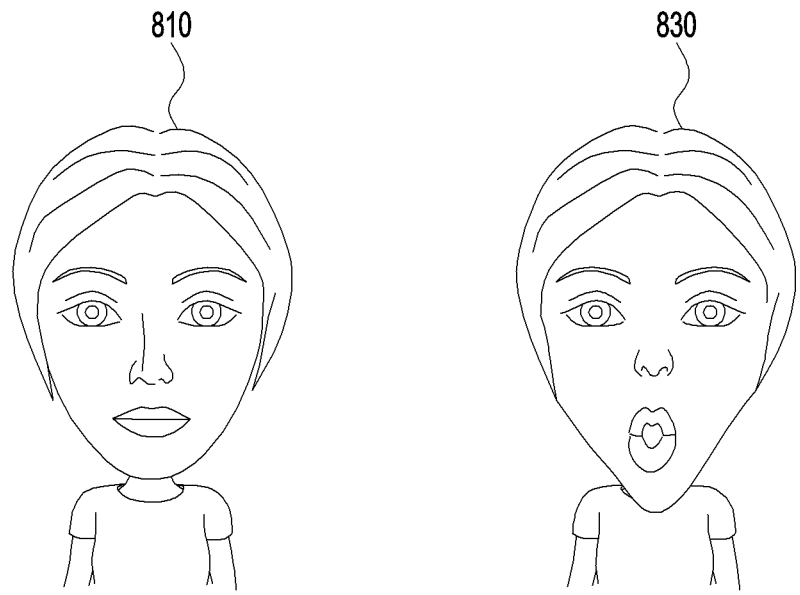

FIGS. 8A and 8B are diagrams illustrating example reference models that an electronic device uses according to an embodiment.

Referring to FIGS. 8A and 8B, a plurality of reference models may include character information representing different expressions. For example, the plurality of reference models may include morph targets to represent different expressions.

Referring to FIG. 8A, a first reference model may include information about a character 820 closing its left eye when compared with a reference character 810.

Referring to FIG. 8B, a second reference model may include information about a character 830 opening its mouth when compared with the reference character 810.

Although FIGS. 8A and 8B illustrate two types of reference models only for ease of description, the type and number of reference models are not limited thereto, but various types of reference models (e.g., those with various expressions) may be applicable according to an embodiment.

FIGS. 9A, 9B, 9C, 9D, and 9E are diagrams illustrating an example operation in which an electronic device varies the expression of an avatar according to an embodiment.

Figure 9A:
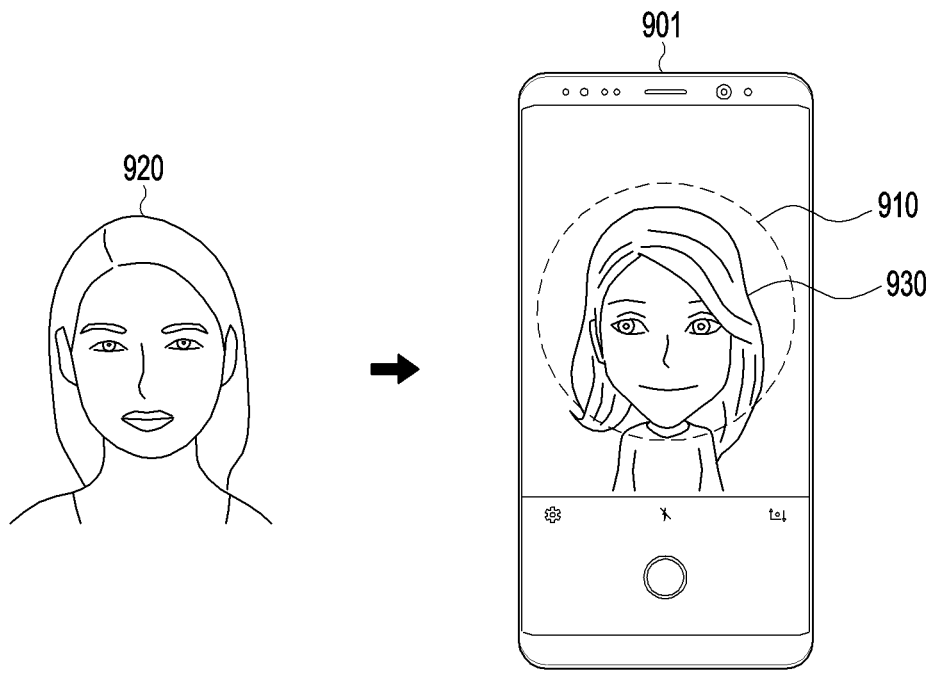
FIGS. 9A, 9B, 9C, 9D, and 9E are diagrams illustrating an example operation in which an electronic device varies an expression of an avatar according to an embodiment.

Referring to FIG. 9A, an electronic device 901 (e.g., the electronic device 201 of FIG. 2) may capture the user's face 920 positioned in a facial recognition region 910 and obtain a plurality of images including the user's face 920.

According to an embodiment, the electronic device 901 may display a first avatar 930 corresponding to the user's face 920 on the facial recognition region 910 using a plurality of feature points included in the first image among the plurality of images.

According to an embodiment, the electronic device 901 may analyze the plurality of feature points included in a second image and determine whether a variation is made to the user's facial expression and the degree of variation according to the result of the analysis.

Figure 9B:
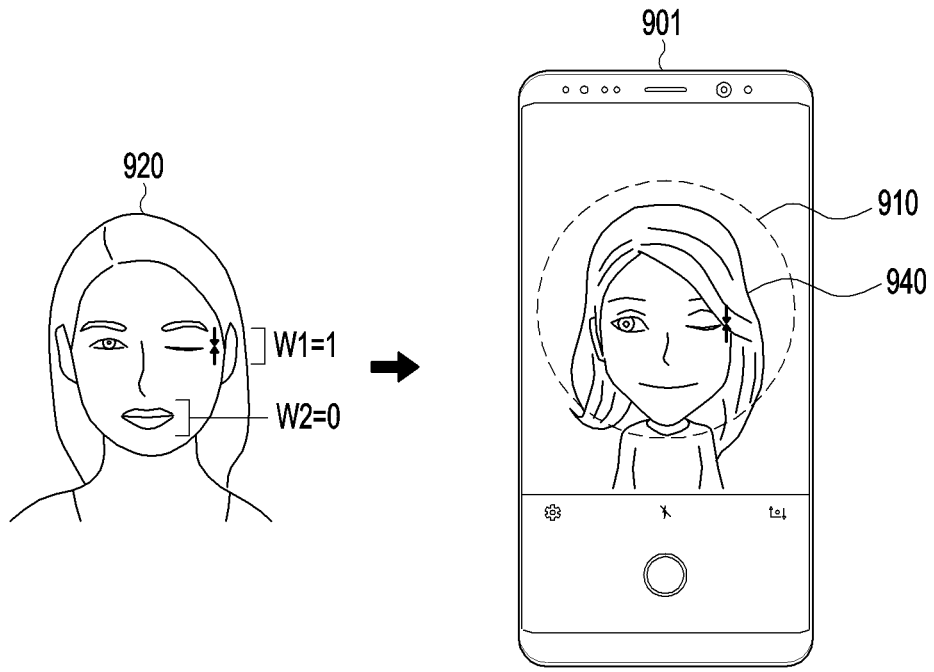

Referring to FIG. 9B, the electronic device 901 may obtain the second image including the user's face 920 fully closing the left eye while displaying the first avatar 930. For example, the electronic device 901 may determine a first weight W1 indicating the degree to which the left eye is closed and a second weight W2 indicating the degree to which the mouth is agape. For example, when the user's left eye is fully closed, the electronic device 901 may determine that the first weight W1 is '1.' When the user's mouth is closed, the electronic device 901 may determine that the second weight W2 is '0.' The electronic device 901 may reflect the first weight (W1=1) to a first reference model (e.g., the first reference model 820 of FIG. 8A) indicating that the user's left eye is fully closed and reflect the second weight (W2=0) to a second reference model (e.g., the second reference model 830 of FIG. 8B) indicating that the user's mouth is open. The electronic device 901 may display a second avatar 940 that fully closes its left eye and closes its mouth by combining the weight-reflected first reference model and the weight-reflected second reference model. For example, as the user's facial expression varies, the electronic device 901 may display the first avatar 930 gradually closing its left eye while transitioning into the second avatar 940.

Figure 9C:
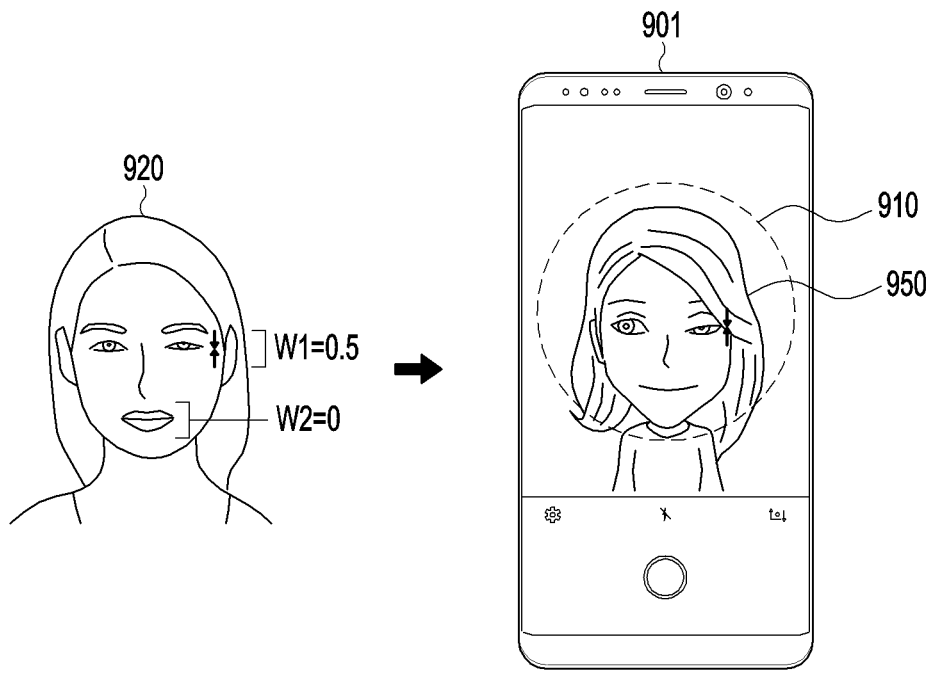

Referring to FIG. 9C, the electronic device 901 may obtain the second image including the user's face 920 with the left eye half-closed while displaying the first avatar 930. For example, the electronic device 901 may determine a first weight W1 indicating the degree to which the left eye half-closed and a second weight W2 indicating the degree to which the mouth is agape. For example, when the user's left eye is exactly half-closed, the electronic device 901 may determine that the first weight W1 is '0.5.' When the user's mouth is closed, the electronic device 901 may determine that the second weight W2 is '0.' The electronic device 901 may reflect the first weight (W1=0.5) to a first reference model (e.g., the first reference model 820 of FIG. 8A) indicating that the user's left eye is closed and reflect the second weight (W2=0) to a second reference model (e.g., the second reference model 830 of FIG. 8B) indicating that the user's mouth is open. The electronic device 901 may display a third avatar 950 that has its left eye half-closed and its mouth fully closed by combining the weight-reflected first reference model and the weight-reflected second reference model. For example, as the user's facial expression varies, the electronic device 901 may display the first avatar 930 gradually closing its left eye while transitioning into the third avatar 940.

Figure 9D:
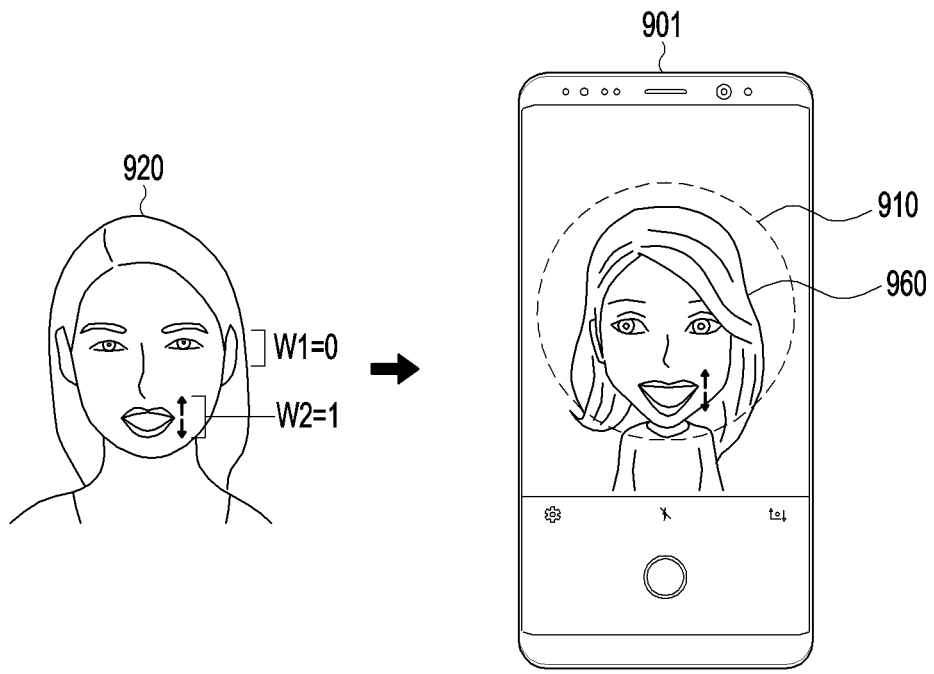

Referring to FIG. 9D, the electronic device 901 may obtain the second image including the user's face 920 with the mouth fully open while displaying the first avatar 930. For example, the electronic device 901 may determine a first weight W1 indicating the degree to which the left eye is closed and a second weight W2 indicating the degree to which the mouth is agape. For example, when the user's left eye is fully open, the electronic device 901 may determine that the first weight W1 is '0.' When the user's mouth is agape, the electronic device 901 may determine that the second weight W2 is '1.' The electronic device 901 may reflect the first weight (W1=0) to a first reference model (e.g., the first reference model 820 of FIG. 8A) indicating that the user's left eye is fully closed and reflect the second weight (W2=1) to a second reference model (e.g., the second reference model 830 of FIG. 8B) indicating that the user's mouth is open. The electronic device 901 may display a fourth avatar 960 that has its left eye fully open and its mouth agape by combining the weight-reflected first reference model and the weight-reflected second reference model. For example, as the user's facial expression varies, the electronic device 901 may display the first avatar 930 gradually opening its mouth while transitioning into the fourth avatar 960.

Figure 9E:
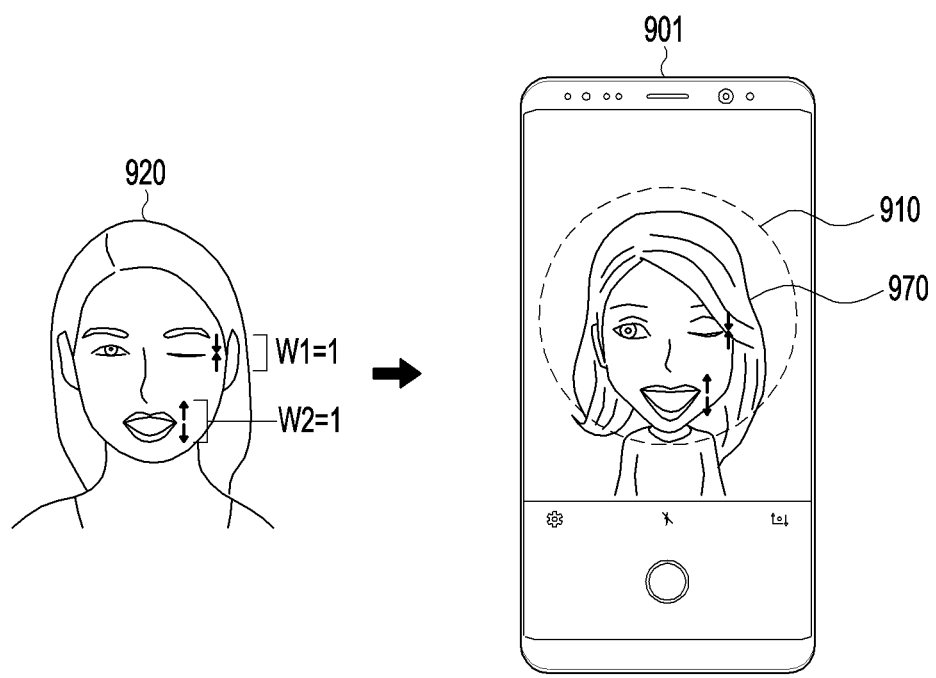

Referring to FIG. 9E, the electronic device 901 may obtain the second image including the user's face 920 with the left eye fully closed and the mouth fully agape while displaying the first avatar 930. For example, the electronic device 901 may determine a first weight W1 indicating the degree to which the left eye is closed and a second weight W2 indicating the degree to which the mouth is agape. For example, when the user's left eye is fully closed, the electronic device 901 may determine that the first weight W1 is '1.' When the user's mouth is agape, the electronic device 901 may determine that the second weight W2 is '1.' The electronic device 901 may reflect the first weight (W1=1) to a first reference model (e.g., the first reference model 820 of FIG. 8A) indicating that the user's left eye is fully closed and reflect the second weight (W2=1) to a second reference model (e.g., the second reference model 830 of FIG. 8B) indicating that the user's mouth is open. The electronic device 901 may display a fifth avatar 970 that has its left eye fully closed and its mouth fully agape by combining the weight-reflected first reference model and the weight-reflected second reference model. For example, as the user's facial expression varies, the electronic device 901 may display the first avatar 930 gradually closing its left eye and gradually opening its mouth while transitioning into the fifth avatar 970.

FIGS. 10A, 10B, and 10C are diagrams illustrating an example operation in which an electronic device provides an avatar according to an embodiment.

Referring to FIGS. 10A, 10B and 10C, an electronic device 1001 (e.g., the electronic device 201 of FIG. 2) may store at least one avatar in a memory (e.g., the memory 230 of FIG. 2). The electronic device 1001 may display a designated avatar among at least one avatar on a display (e.g., the display 260 of FIG. 2).

According to an embodiment, the electronic device 1001 may display a plurality of objects 1005, 1015, and 1025 representing a plurality of avatars in the memory 230 on the display 260.

Referring to FIG. 10A, when a first object 1005 is designated from among the plurality of objects 1005, 1015, and 1025, the electronic device 1001 may display a first avatar 1010 corresponding to the first object 1005 on the display 260.

Referring to FIG. 10B, when a second object 1015 is designated from among the plurality of objects 1015, 1015, and 1025, the electronic device 1001 may display a second avatar 1020 corresponding to the second object 1015 on the display 260.

Referring to FIG. 10C, when a third object 1025 is designated from among the plurality of objects 1025, 1025, and 1025, the electronic device 1001 may display a third avatar 1030 corresponding to the third object 1025 on the display 260.

According to an embodiment, the electronic device 1001 may apply different pieces of expression variation information to the first avatar 1010, the second avatar 1020, and the third avatar 1030 so that the respective features of the avatars are emphasized as the plurality of feature points included in each of the first image and the second image are varied. For example, the electronic device 1001 may adjust the weight, which is determined according to a variation in the plurality of feature points included in each of the first image and second image, differently for each avatar.

According to an embodiment, the first avatar 1010, the second avatar 1020, and the third avatar 1030 may represent the same expression (e.g., the left eye closed). The electronic device 1001 may represent various expressions according to the features of each avatar 1010, 1020, and 1030 (or the features of the character represented by each avatar). For example, the third avatar 1030 may represent an exaggerated expression when compared with the first avatar 1010 and the second avatar 1020. The second avatar 1020 may represent an expression appropriate for the character the second avatar 1020 represents when compared with the first avatar 1010 and the third avatar 1030. In other words, when different avatars are set, the electronic device 1001 may represent different degrees of expression variation for the same expression.

Figure 11:
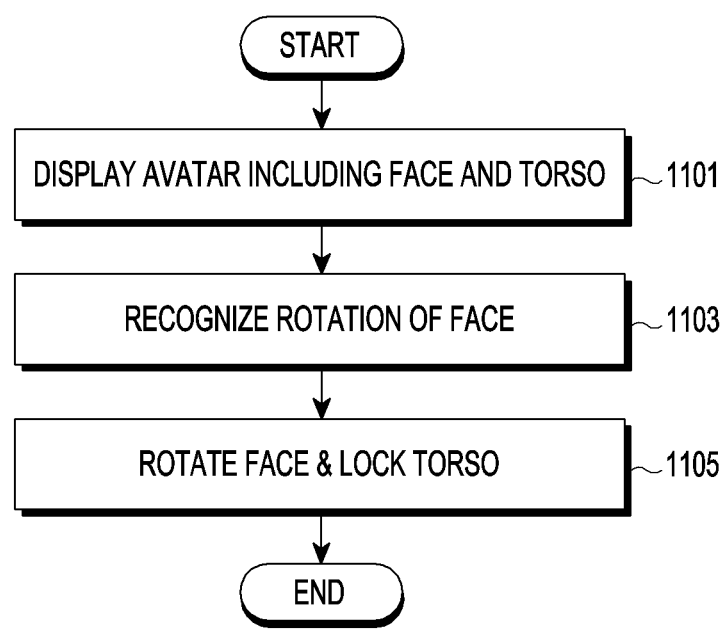
FIG. 11 is a flowchart illustrating an example operation in which an electronic device provides an avatar according to an embodiment.

FIG. 11 is a flowchart illustrating an example operation in which an electronic device provides an avatar according to an embodiment.

Referring to FIG. 11, an electronic device (e.g., the electronic device 201 of FIG. 2) may display a 3D modeling-based avatar on a display (e.g., the display 260 of FIG. 2).

In operation 1101, the electronic device 201 may display an avatar including a face and a torso. The electronic device 201 may determine feature points of the user's face and display the face of the avatar corresponding to the user's face based on the determined feature points. The electronic device 201 may couple the torso to the portion (e.g., the neck) under the avatar's face and display the avatar. For example, the avatar's torso may have a designated form or shape.

In operation 1103, the electronic device 201 may recognize (or determine) the rotation of the user's face. For example, the electronic device 201 may compare a first image (e.g., an image serving as a reference) and a second image (e.g., an image obtained after the first image is obtained) among a plurality of images including the user's face, determining the rotation of the user's face.

In operation 1105, the electronic device 201 may rotate the avatar's face as the user's face rotates. The electronic device 201 may lock the avatar's torso to a first surface (e.g., the bottom surface of the display 260) of the electronic device 201 (or the display 260 of the electronic device 201). For example, the electronic device 201 may rotate only the avatar's face, but with the torso locked to the first surface.

Each of the above-described operations may be performed by a processor (e.g., the processor 120 of FIG. 1, the processor 220 of FIG. 2, or an image signal processor (ISP)).

Figure 12A:
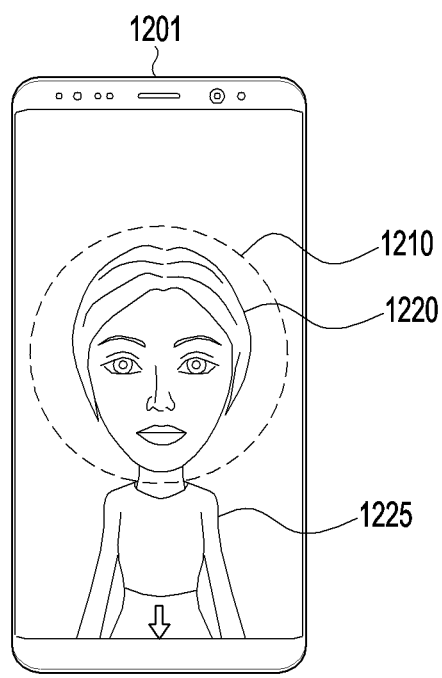
FIGS. 12A and 12B are diagrams illustrating an example operation in which an electronic device controls an avatar according to an embodiment.
Figure 12B:
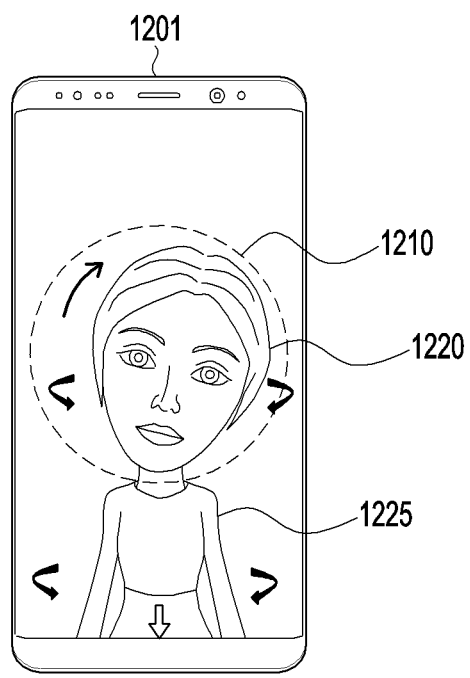

FIGS. 12A and 12B are diagrams illustrating an example operation in which an electronic device controls an avatar according to an embodiment.

Referring to FIG. 12A, an electronic device 1201 (e.g., the electronic device 201 of FIG. 2) may display an avatar including a face 1220 and a torso 1225 on a facial recognition region 1210. The electronic device 1201 may couple the torso 1225 to the portion (e.g., the neck) under the avatar's face 1220 and display the avatar.

Referring to FIG. 12B, the electronic device 1201 may rotate the avatar's face 1220 as the user's face rotates. For example, the electronic device 1201 may rotate the avatar's face 1220 about at least one of a virtual x axis, a virtual y axis, and a virtual z axis as the user's face rotates about at least one of the virtual x axis, y axis, and z axis. For example, the electronic device 1201 may rotate the avatar's face 1220 up to a designated angle (e.g., from −45 degrees to 45 degrees) to naturally rotate the face.

The electronic device 201 may lock the avatar's torso 1225 to a first surface (e.g., the bottom surface of the display 1201) of the electronic device 1201. For example, the electronic device 201 may rotate only the avatar's face 1220, but with the torso 1225 locked to the first surface. The electronic device 1201 may rotate the avatar's torso 1225 about the virtual z axis as the avatar's face 1220 rotates. The electronic device 1201 may rotate the avatar's torso 1225 up to a designated angle (e.g., from −45 degrees to 45 degrees).

Figure 13:
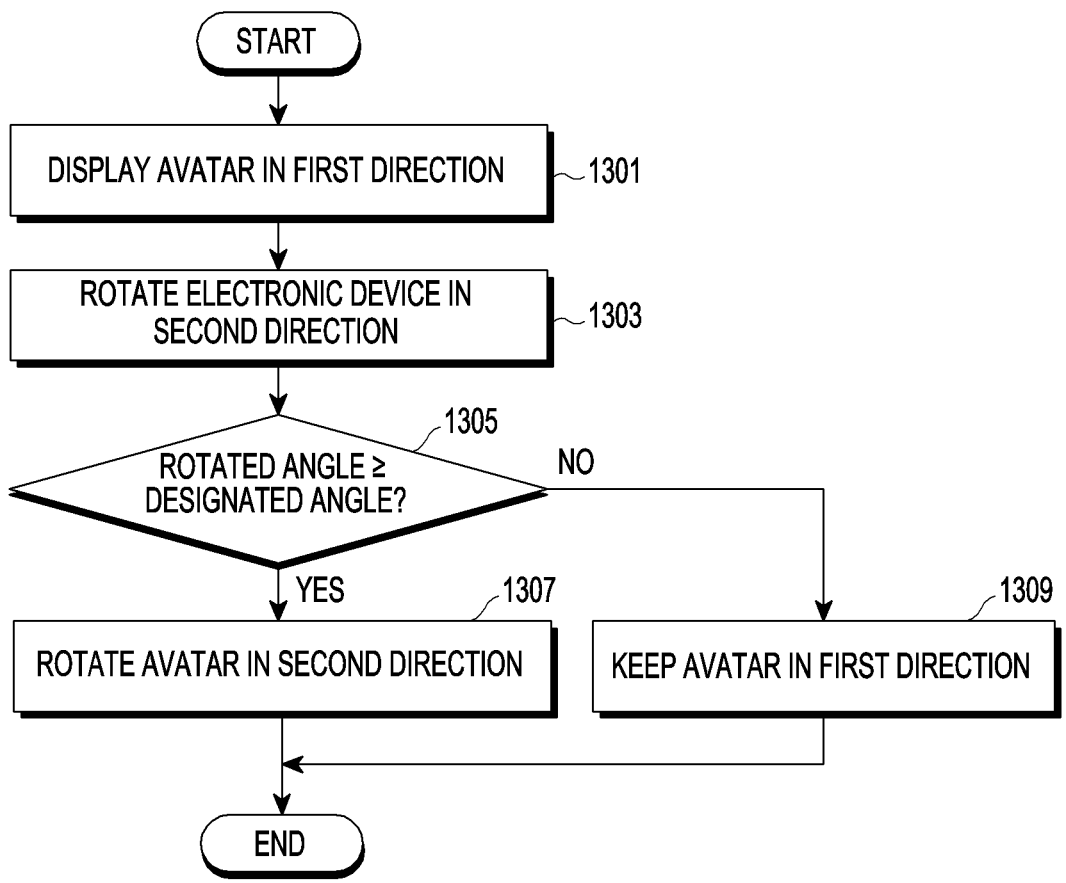
FIG. 13 is a flowchart illustrating an example operation in which an electronic device provides an avatar according to an embodiment.

FIG. 13 is a flowchart illustrating an example operation in which an electronic device provides an avatar according to an embodiment.

Referring to FIG. 13, in operation 1301, an electronic device (e.g., the electronic device 201 of FIG. 2) may display an avatar corresponding to the user's face on a display (e.g., the display 260 of FIG. 2) in a first direction.

In operation 1303, the electronic device 201 may rotate in a second direction. The electronic device 201 may detect its rotation using a sensor (e.g., the sensor 176 of FIG. 1) included in the electronic device 201. For example, the sensor may include a gyro sensor.

In operation 1305, the electronic device 201 may determine the angle of rotation. The electronic device 201 may compare the rotated angle with a designated angle. For example, the designated angle may be set automatically or manually by the user.

In operation 1307, when the rotated angle is equal to or larger than the designated angle, the electronic device 201 may rotate the avatar, which is displayed in the first direction, in a second direction.

In operation 1309, when the rotated angle is smaller than the designated angle, the electronic device 201 may continue displaying the avatar in the first direction.

Each of the above-described operations may be performed by a processor (e.g., the processor 120 of FIG. 1, the processor 220 of FIG. 2, or an image signal processor (ISP)).

FIGS. 14A, 14B, 14C and 14D are diagrams illustrating an example operation in which an electronic device provides an avatar according to an embodiment.

Figure 14:
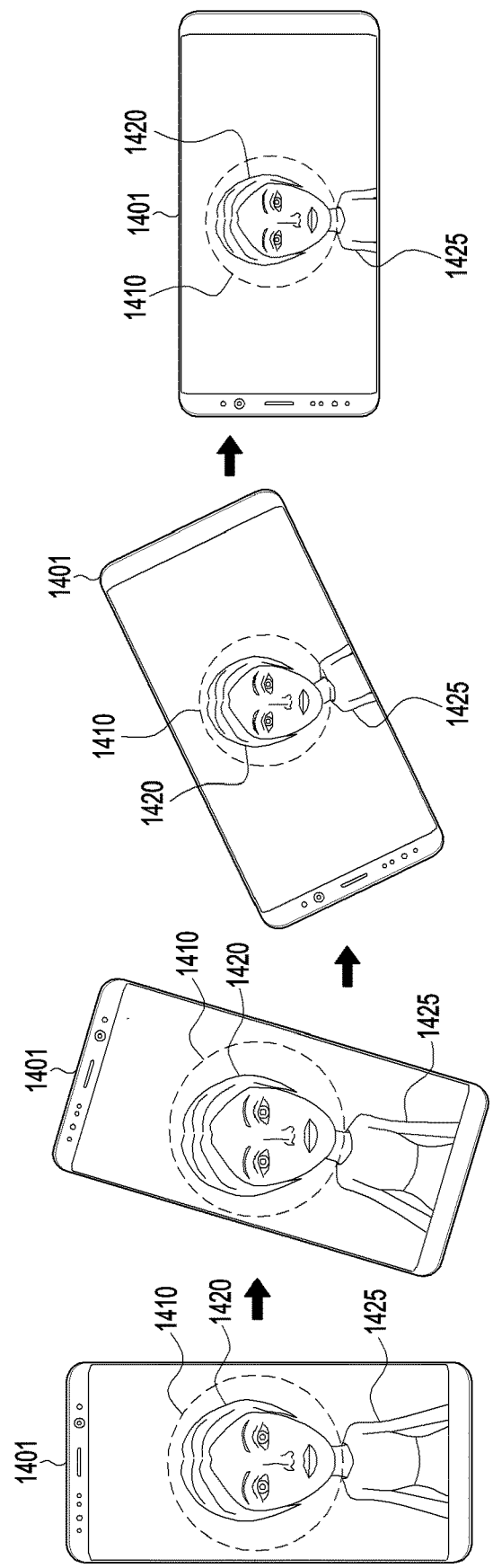
FIGS. 14A, 14B, 14C and 14D are diagrams illustrating an example operation in which an electronic device provides an avatar according to an embodiment.

Referring to FIG. 14A, an electronic device 1401 (e.g., the electronic device 201 of FIG. 2) may display an avatar's face 1420 on a facial recognition region 1410. The electronic device 1401 may couple the avatar's torso 1425 to the neck of the avatar's face 1420. The avatar's torso 1425 may be locked to a first surface of the electronic device 1401.

Referring to FIG. 14B, when the electronic device 1401 rotates at an angle (e.g., 30 degrees) smaller than a designated angle (e.g., 45 degrees), the electronic device 1401 may rotate the avatar's torso 1425, which is locked to the first surface of the electronic device 1401, as per the rotation of the electronic device 1401. The avatar's face 1420 may not rotate in the direction along which the electronic device 1401 rotates. For example, the facial recognition region 1410 and the avatar's face 1420 displayed on the facial recognition region 1410 may be rotated so as not to be awkward about the avatar's rotated torso 1425 in a direction opposite to the direction along which the electronic device 1401 rotates.

Referring to FIG. 14C, when the electronic device 1401 rotates at an angle (e.g., 60 degrees) larger than the designated angle (e.g., 45 degrees), the electronic device 1401 may rotate the avatar's torso 1425 as per the rotation of the electronic device 1401. The avatar's torso 1425 may be locked to a second surface of the electronic device 1401. The facial recognition region 1410 and the avatar's face 1420 displayed on the facial recognition region 1410 may be rotated so as not to be awkward about the avatar's rotated torso 1425 in the direction along which the electronic device 1401 rotates.

Referring to FIG. 14D, when the electronic device 1401 rotates at an angle (e.g., 90 degrees) larger than the designated angle (e.g., 45 degrees), the electronic device 1401 may rotate, and display, the avatar's face 1420 and torso 1425 as per the rotation of the electronic device 1401. For example, the avatar as shown in FIG. 14D may be in a 90 degrees-rotated position relative to the avatar shown in FIG. 14A.

Figure 15:
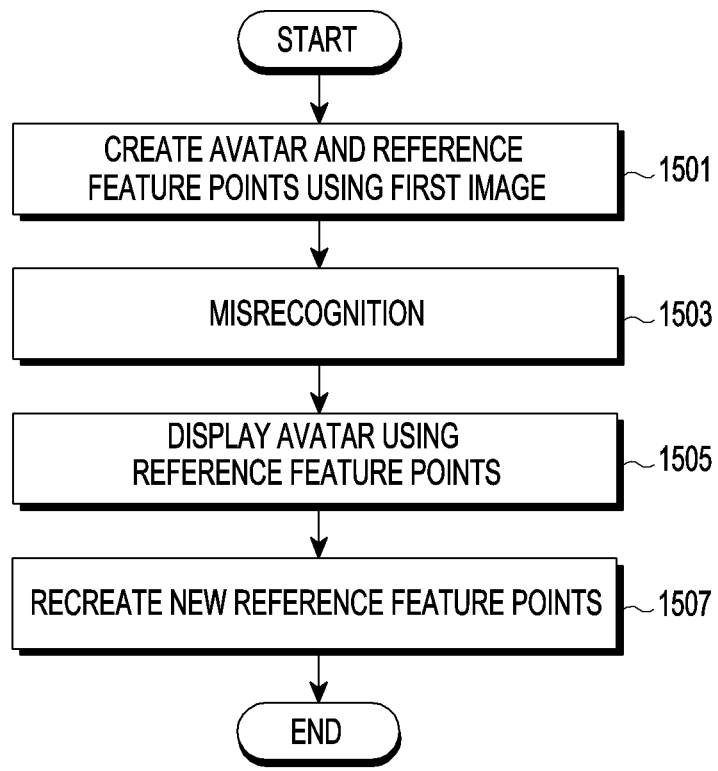
FIG. 15 is a flowchart illustrating an example operation in which an electronic device provides an avatar according to an embodiment.

FIG. 15 is a flowchart illustrating an example operation in which an electronic device provides an avatar according to an embodiment.

Referring to FIG. 15, an electronic device (e.g., the electronic device 201 of FIG. 2) may obtain a plurality of images including the user's face.

In operation 1501, the electronic device 201 may create an avatar using a plurality of feature points included in a first image serving as a reference among the plurality of images. The electronic device 201 may display the avatar on a display (e.g., the electronic device 201 of FIG. 2).

In operation 1501, the electronic device 201 may create (or set) the plurality of feature points included in the first image as reference feature points to determine a variation in the user's facial expression. The electronic device 201 may vary the avatar's expression as per variation between the plurality of feature points included in the first image and second image.

In operation 1503, the electronic device 201 may not be able to recognize the user's face. The electronic device 201 may encounter an error in recognizing the user's face. For example, upon failing to precisely determine the feature points from the image including the user's face, the electronic device 201 may not be able to recognize the user's face and/or variation in facial expressions. When the user's face departs from the facial recognition region, the electronic device 201 may fail to recognize the user's face and/or variation in the facial expression.

Failure to precisely recognize the user's face may result in further misrecognition of the avatar's expression. In operation 1505, the electronic device 201 may display an avatar rendered using the plurality of feature points included in the first image instead of the prior avatar displayed.

According to an embodiment, upon receiving a third image including the user's face different the user's face included in the first image, the electronic device 201 may display an avatar rendered using the reference feature points. In this case, the electronic device 201 may abstain from tracking variation in the prior facial expression included in the first image.

In operation 1507, when able to again identify a plurality of feature points of the user's face through a fourth image, the electronic device 201 may create (or set) the plurality of feature points included in the fourth image as reference feature points. For example, upon receiving the fourth image including the prior user face after receiving the third image, the electronic device 201 may recreate (or reset) the plurality of feature points included in the fourth image as new reference feature points.

Each of the above-described operations may be performed by a processor (e.g., the processor 120 of FIG. 1, the processor 220 of FIG. 2, or an image signal processor (ISP)).

FIGS. 16A, 16B, 16C, and 16D are diagrams illustrating an example operation in which an electronic device provides an avatar according to an embodiment.

Figure 16A:
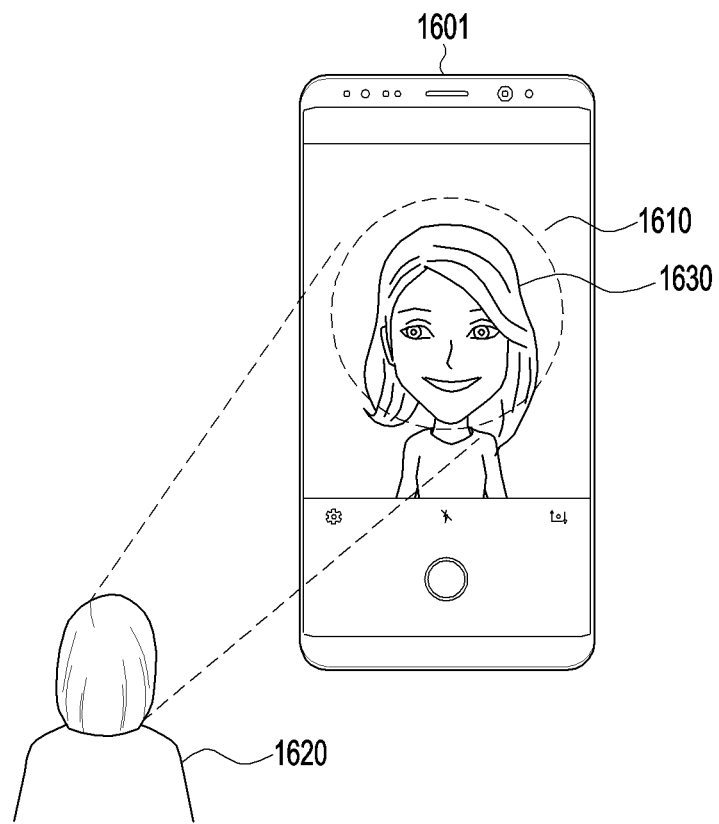
FIGS. 16A, 16B, 16C, and 16D are diagrams illustrating an example operation in which an electronic device provides an avatar according to an embodiment.

Referring to FIG. 16A, when the user's face 1620 is positioned in a facial recognition region 1610, an electronic device 1601 (e.g., the electronic device 201 of FIG. 2) may display an avatar 1630 corresponding to the user's face 1620 using a plurality of feature points included in the user's face 1620. In this case, the electronic device 1601 may set the plurality of feature points included in the user's face 1620 as reference feature points.

Figure 16B:
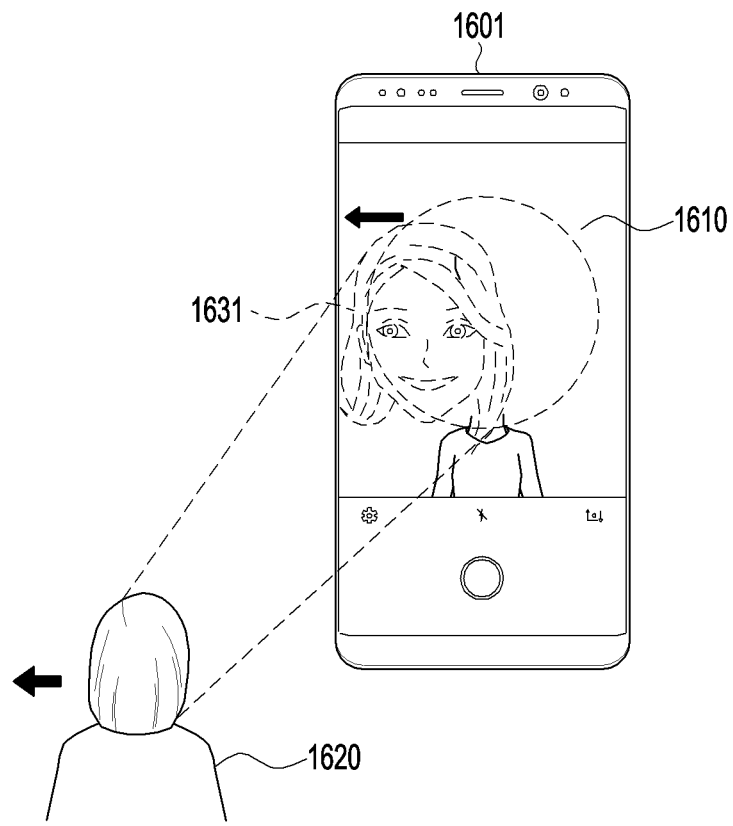

Referring to FIG. 16B, when the user's face 1620 departs from the facial recognition region 1610, the electronic device 1601 may be unable to identify the plurality of feature points included in the user's face 1620. As unable to identify the plurality of feature points, the electronic device 1601 may precisely determine variation in the facial expression of the user's face 1620, thus failing to precisely vary the avatar's expression. For example, the electronic device 1601 may display the avatar 1631 failing to precisely reflect the expression of the user's face 1620. In this case, the electronic device 1601 may stop tracking variation in the expression of the user's face 1620.

Figure 16C:
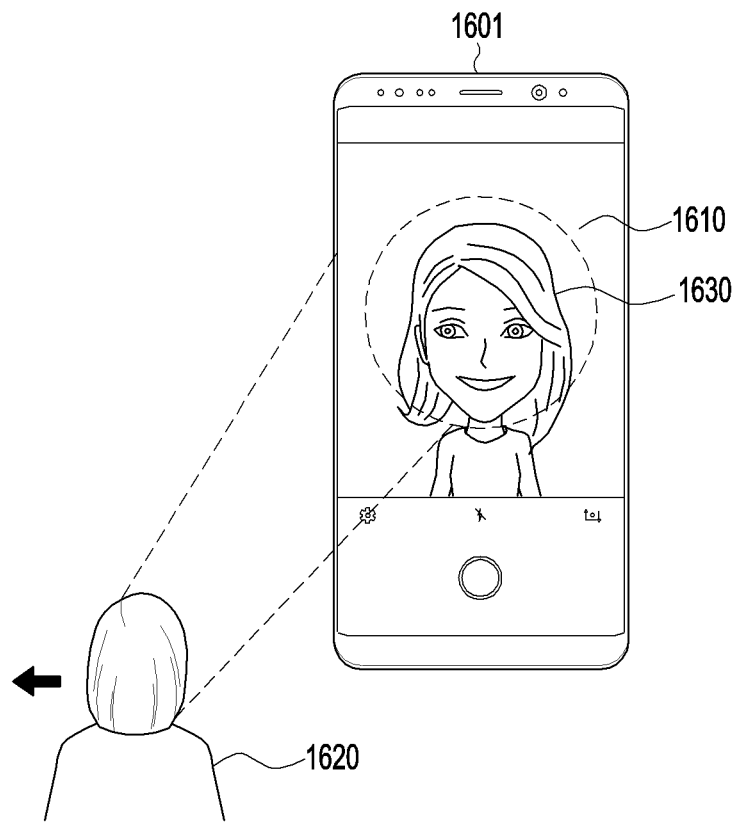

Referring to FIG. 16C, when the user's face 1620 departs from the facial recognition region 1610, the electronic device 1601 may display an avatar 1630 rendered using the reference feature points on the facial recognition region 1610. For example, the electronic device 1601 may display the avatar 1630 on a frame (e.g., an N+1th frame) next to a frame (e.g., an Nth frame) where the avatar 1631 is displayed.

Figure 16D:
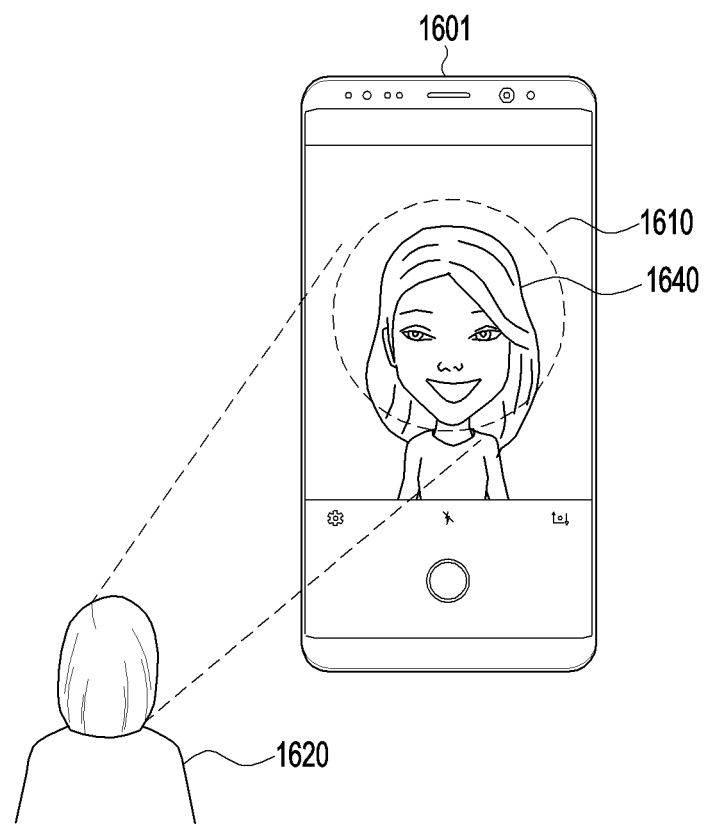

Referring to FIG. 16D, when the user's face 1620 is repositioned in a facial recognition region 1610, the electronic device 1601 may display a new avatar 1640 corresponding to the user's face 1620 using a plurality of feature points included in the user's face 1620. For example, the electronic device 1601 may analyze the plurality of feature points included in the user's face 1620, determining new reference feature points. The electronic device 1601 may track variation in the expression of the user's face 1620 based on the new reference feature points.

According to an embodiment, an electronic device comprises a camera, a display, and a processor configured to control the electronic device to: obtain a plurality of images including a first image and a second image corresponding to a user's face using the camera, display, on the display, a first avatar selected from among at least one three-dimensional (3D) avatar including model information related to a motion, determine a degree of variation between at least some of a plurality of first feature points corresponding to the face included in the first image and at least some of a plurality of second feature points corresponding to the face included in the second image, determine a weight for at least some of a plurality of reference models related to a motion of the first avatar based at least on the degree of variation, and display, on the display, the first avatar on which the motion is performed based on the plurality of reference models and the weight.

The processor may be configured to determine the weight of each of the at least some reference models based on the degree of variation in each of the at least some feature points included the second image with respect to the at least some feature points included in the first image.

The processor may be configured to apply the weight of each of the at least some reference model to each of the at least some reference models based on the degree of variation and display an avatar with a facial expression by combining the at least some reference models to which the weight is applied.

The first plurality of feature points may each correspond to a designated region of the face. And, the second plurality of feature points may each correspond to a designated region of the face The processor may be configured to create the avatar using the plurality of first feature points included in the first image.

The processor may be configured to determine the plurality of first feature points included in the first image as reference feature points to determine whether a variation is made to a facial expression.

The processor may be configured to display the avatar rendered using the reference feature points upon failing to identify the plurality of first feature points of the face through the camera.

The processor may be configured to display the avatar rendered using the reference feature points upon receiving a third image including a face different from the face included in the first image.

The processor may be configured to, upon receiving a fourth image including the face through the camera after receiving the third image, determine a plurality of feature points corresponding to the face included in the fourth image as new reference feature points.

The first avatar may include a face portion and a torso portion. The processor may be configured to rotate and display the face portion based on the degree of variation.

The processor may be configured to lock and display the torso portion in a first surface direction of the display.

The processor may be configured to display the first avatar, previously displayed in a first direction, in a second direction based on the electronic device being rotated at a designated angle or more.

The processor may be configured to apply the degree of variation in the expression, which differs from the degree of variation applied to the first avatar, to a second avatar different from the first avatar among the one or more avatars.

Determining the weight may include determining the weight of each of the at least some reference models based on the degree of variation in each of the at least some feature points included the second image with respect to the at least some feature points included in the first image.

Displaying the motion-performed first avatar may include applying the weight of each of the at least some reference model to each of the at least some reference models corresponding to the degree of variation and displaying the first avatar with a facial expression by combining the at least some reference models to which the weight is applied.

According to an embodiment, a method of operating an electronic device, comprises: obtaining a plurality of images including a first image and a second image corresponding to a user's face using a camera of the electronic device; displaying, on a display of the electronic device, a first avatar selected from among at least one 3D avatar including model information related to a motion; determining a degree of variation between at least some of a plurality of first feature points corresponding to the face included in the first image and at least some of a plurality of second feature points corresponding to the face included in the second image; determining a weight for at least some of a plurality of reference models related to a motion of the first avatar based on, at least, the degree of variation; and displaying, on the display, the first avatar on which the motion is performed based on the plurality of reference models and the weight.

The method may further comprise creating the first avatar using the plurality of first feature points included in the first image.

The method may further comprise determining the plurality of first feature points included in the first image as reference feature points to determine whether a variation is made to a facial expression and displaying the avatar rendered using the reference feature points upon failing to identify the plurality of first feature points through the camera.

The method may further comprise rotating and displaying a face portion of the first avatar based on the degree of variation and locking and displaying a torso portion of the first avatar in a first surface direction of the display.

According to an embodiment, a non-transitory computer readable recording medium having stored thereon a program that when executed by a processor causes an electronic device to perform operations including: obtaining a plurality of images including a first image and a second image corresponding to a user's face using a camera of an electronic device, displaying, on a display of the electronic device, a first avatar selected from among at least one 3D avatar including model information related to a motion, determining a degree of variation between at least some of a plurality of first feature points corresponding to the face included in the first image and at least some of a plurality of second feature points corresponding to the face included in the second image, determining a weight for at least some of a plurality of reference models related to a motion of the first avatar based at least on the degree of variation, and displaying, on the display, the first avatar on which the motion is performed based on the plurality of reference models and the weight.

Each of the aforementioned components of the electronic device may include one or more parts, and a name of the part may vary with a type of the electronic device. The electronic device in accordance with various example embodiments of the disclosure may include at least one of the aforementioned components, omit some of them, or include other additional component(s). Some of the components may be combined into an entity, but the entity may perform the same functions as the components may do.

As is apparent from the foregoing description, according to various embodiments, it is possible to create an avatar using a plurality of feature points included in the user's face and make lifelike expressions corresponding to changes in the user's facial expression through the avatar.

The various example embodiments disclosed herein are provided for illustrative non-limiting description and understanding of the disclosed technology and does not limit the scope of the disclosure. Accordingly, the scope of the disclosure should be interpreted as including all changes or various embodiments based on the technical spirit of the disclosure.

What is claimed is:

1. An electronic device, comprising:
   a camera;
   a display; and
   a processor configured to control the electronic device to:
      obtain a plurality of images including a first image and a second image corresponding to a user's face using the camera,
      display, on the display, a first avatar selected from among at least one three-dimensional (3D) avatar including model information related to a motion,
      determine a degree of variation between at least some of a plurality of first feature points corresponding to the face included in the first image and at least some of a plurality of second feature points corresponding to the face included in the second image,
      determine a weight for each of at least some of a plurality of reference models associated with a motion of the first avatar based at least on the degree of variation, each of the at least some of the plurality of reference models related to each of a plurality of different motions of the first avatar,
      display, on the display, the first avatar on which the motion is performed based on applying the weight to each of the plurality of reference models, and
      adjust a size of the first avatar based on a difference between a first distance between the plurality of first feature points and a second distance between the plurality of second feature points,
      wherein the processor is further configured to control the electronic device to:
         when the distance between the plurality of second feature points included in the second image narrows at a predetermined rate with respect to the plurality of first feature points included in the first image, shrink the size of the first avatar; and
         when the distance between the plurality of second feature points included in the second image widens at the predetermined rate with respect to the plurality of first feature points included in the first image, enlarge the size of the first avatar.

2. The electronic device of claim 1, wherein the processor is configured to determine a weight of each of the plurality of reference models based on the degree of variation in each of the at least some feature points included in the second image with respect to the at least some feature points included in the first image.

3. The electronic device of claim 2, wherein the processor is configured to apply the weight of each of the plurality of reference models to each of the plurality of reference models corresponding to the degree of variation and display an avatar with an expression of the face by combining the plurality of reference models to which the weight is applied.

4. The electronic device of claim 1, wherein each of the first plurality of feature points corresponds to a designated region on the face.

5. The electronic device of claim 1, wherein the processor is configured to create the avatar using the plurality of first feature points included in the first image.

6. The electronic device of claim 5, wherein the processor is configured to determine the plurality of first feature points included in the first image as reference feature points to determine whether a variation is made to an expression of the face.

7. The electronic device of claim 6, wherein the processor is configured to control the display to display the avatar rendered using the reference feature points upon failing to identify the plurality of first feature points of the face through the camera.

8. The electronic device of claim 6, wherein the processor is configured to control the display to display the avatar rendered using the reference feature points upon receiving a third image including a face different from the face included in the first image.

9. The electronic device of claim 8, wherein the processor is configured to, upon receiving a fourth image including the face through the camera after receiving the third image, determine a plurality of feature points corresponding to the face included in the fourth image as new reference feature points.

10. The electronic device of claim 1, wherein the first avatar includes a face portion and a torso portion, and wherein the processor is configured to rotate and display the face portion based on the degree of variation.

11. The electronic device of claim 10, wherein the processor is configured to lock the torso portion in a first surface direction of the display and to control the display to display the locked torso portion.

12. The electronic device of claim 1, wherein the processor is configured to control the display to display the first avatar, previously displayed in a first direction, in a second direction when the electronic device rotates by a designated angle or greater.

13. The electronic device of claim 1, wherein the processor is configured to apply a degree of variation in expression, which differs from the degree of variation applied to the first avatar, to a second avatar different from the first avatar among the at least one avatar.

14. A method of operating an electronic device, the method comprising:
   obtaining a plurality of images including a first image and a second image corresponding to a user's face using a camera of the electronic device;
   displaying, on a display of the electronic device, a first avatar selected from among at least one 3D avatar including model information related to a motion;
   determining a degree of variation between at least some of a plurality of first feature points corresponding to the face included in the first image and at least some of a plurality of second feature points corresponding to the face included in the second image;
   determining a weight for each of at least some of a plurality of reference models associated with a motion of the first avatar based at least on the degree of variation, each of the at least some of the plurality of reference models related to each of a plurality of different motions of the first avatar; and
   displaying, on the display, the first avatar on which the motion is performed based on applying the weight to each of the plurality of reference models,
   wherein a size of the first avatar is adjusted based on a difference between a first distance between the plurality of first feature points and a second distance between the plurality of second feature points,
   wherein displaying the first avatar further comprises:
      when the distance between the plurality of second feature points included in the second image narrows at a predetermined rate with respect to the plurality of first feature points included in the first image, shrinking the size of the first avatar; and when the distance between the plurality of second feature points included in the second image widens at the predetermined rate with respect to the plurality of first feature points included in the first image, enlarging the size of the first avatar.

15. The method of claim 14, wherein determining the weights includes determining a weight of each of the plurality of reference models based on a degree of variation in each of the at least some feature points included in the second image with respect to the at least some feature points included in the first image.

16. The method of claim 15, wherein displaying the motion-performed first avatar includes applying the weight of each of the plurality of reference models to each of the plurality of reference models corresponding to the degree of variation and displaying the first avatar with an expression of the face by combining the plurality of reference models to which the weight is applied.

17. The method of claim 14, further comprising creating the first avatar using the plurality of first feature points included in the first image.

18. The method of claim 17, further comprising:
   determining the plurality of first feature points included in the first image as reference feature points to determine whether a variation is made to an expression of the face; and
   displaying the avatar rendered using the reference feature points upon failing to identify the plurality of first feature points through the camera.

19. The method of claim 14, further comprising rotating and displaying a face portion of the first avatar based on the degree of variation and locking and displaying a torso portion of the first avatar in a first surface direction of the display.

20. A non-transitory computer readable recording medium having recorded thereon a program that when executed by a processor causes an electronic device to perform operations comprising:
   obtaining a plurality of images including a first image and a second image corresponding to a user's face using a camera of the electronic device;
   displaying, on a display of the electronic device, a first avatar selected from among at least one 3D avatar including model information related to a motion;
   determining a degree of variation between at least some of a plurality of first feature points corresponding to the face included in the first image and at least some of a plurality of second feature points corresponding to the face included in the second image;
   determining a weight for each of at least some of a plurality of reference models associated with a motion of the first avatar based at least on the degree of variation, each of the at least some of the plurality of reference models related to each of a plurality of different motions of the first avatar; and
   displaying, on the display, the first avatar on which the motion is performed based on applying the weight to each of the plurality of reference models,
      wherein a size of the first avatar is adjusted based on a difference between a first distance between the plurality of first feature points and a second distance between the plurality of second feature points,
   wherein displaying the first avatar further comprises:
      when the distance between the plurality of second feature points included in the second image narrows at a predetermined rate with respect to the plurality of first feature points included in the first image, shrinking the size of the first avatar; and
      when the distance between the plurality of second feature points included in the second image widens at the predetermined rate with respect to the plurality of first feature points included in the first image, enlarging the size of the first avatar.

* * * * *